US009019986B2

(12) United States Patent  
Calcev et al.

(10) Patent No.: US 9,019,986 B2
(45) Date of Patent: Apr. 28, 2015

(54) SYSTEM AND METHOD FOR COMMUNICATIONS LINK CONTROL

(71) Applicant: FutureWei Technologies, Inc., Plano, TX (US)

(72) Inventors: George Calcev, Hoffman Estates, IL (US); Bin Chen, Schaumburg, IL (US); Lin Cai, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 47 days.

(21) Appl. No.: 13/649,082

(22) Filed: Oct. 10, 2012

(65) Prior Publication Data

US 2013/0128867 A1 May 23, 2013

Related U.S. Application Data

(60) Provisional application No. 61/561,707, filed on Nov. 18, 2011.

(51) Int. Cl.
*H04J 3/00* (2006.01)
*H04W 72/04* (2009.01)
*H04W 48/12* (2009.01)
*H04W 28/06* (2009.01)
*H04W 84/12* (2009.01)
*H04W 88/08* (2009.01)
*H04W 72/12* (2009.01)

(52) U.S. Cl.
CPC ............ *H04W 72/042* (2013.01); *H04W 28/06* (2013.01); *H04W 84/12* (2013.01); *H04W 88/08* (2013.01); *Y02B 60/50* (2013.01); *H04W 72/1289* (2013.01); *H04W 48/12* (2013.01)

(58) Field of Classification Search
USPC .................................. 370/310–349, 431–469
See application file for complete search history.

(56) References Cited

U.S. PATENT DOCUMENTS

| | | | |
|---|---|---|---|
| 6,934,299 B2 * | 8/2005 | Kaatz ............................. | 370/459 |
| 7,366,103 B2 | 4/2008 | Engwer et al. | |
| 7,650,559 B2 | 1/2010 | Nishibayashi et al. | |
| 8,249,644 B2 * | 8/2012 | Taniuchi et al. ........... | 455/550.1 |

(Continued)

FOREIGN PATENT DOCUMENTS

| | | |
|---|---|---|
| CN | 1716894 A | 1/2006 |
| CN | 102711228 A | 10/2012 |

OTHER PUBLICATIONS

U.S. Office Action received in U.S. Appl. No. 13/681,093, mailed Mar. 18, 2014, 34 pages.

(Continued)

*Primary Examiner* — Kwang B Yao
*Assistant Examiner* — Juvena Loo
(74) *Attorney, Agent, or Firm* — Slater & Matsil, LLP

(57) ABSTRACT

A method for operating an access point includes receiving information from a first station configured to operate in a non-traffic-indication-map (non-TIM) mode, and determining if downlink data intended for the first station is available at the access point. The method also includes transmitting at least one of the downlink data intended for the first station to the first station, a data indicator indicating that the downlink data intended for the first station is available at the access point, information indicating downlink data is available for the first station, and a time indicator indicating a specific time when the downlink data intended for the first station will be sent to the first station.

36 Claims, 13 Drawing Sheets

(56) References Cited

U.S. PATENT DOCUMENTS

| | | | |
|---|---|---|---|
| 8,588,868 B2* | 11/2013 | Miyata | 455/574 |
| 2003/0086443 A1 | 5/2003 | Beach | |
| 2004/0246983 A1 | 12/2004 | Kaatz | |
| 2005/0025092 A1 | 2/2005 | Morioka et al. | |
| 2005/0220145 A1 | 10/2005 | Nishibayashi et al. | |
| 2005/0286454 A1 | 12/2005 | Morimoto et al. | |
| 2006/0039345 A1 | 2/2006 | Perez-Costa | |
| 2007/0297438 A1* | 12/2007 | Meylan et al. | 370/445 |
| 2008/0117851 A1* | 5/2008 | Irie et al. | 370/311 |
| 2009/0016306 A1 | 1/2009 | Wang et al. | |
| 2011/0319073 A1 | 12/2011 | Ekici et al. | |

OTHER PUBLICATIONS

"IEEE Standard for Information technology—Telecommunications and information exchange between systems—Local and metropolitan area networks—Specific requirements," IEEE Computer Society, IEEE Std 802.11-2007 (Revision of IEEE Std 802.11-1999), Jun. 12, 2007, 1,231 pages, IEEE, New York, New York.

Park, M., et al., "TGah TIM Element Improvements," Extend Submission, filename: 20111019r0-Intel-TIM-improvement, Oct. 19, 2011, 14 pages, Intel Corp.

Merlin, S., et al., "Efficient TIM signaling," Extend Submission, 20111031r0 Qualcomm Efficient TIM signaling, Oct. 31, 2011, 12 pages.

Wentink, M., et al., "Lower Power Medium Access,"doc: IEEE 802.11-12/0114r0, Jan. 16, 2012, 13 pages.

Calcev, G., et al., "Non-TIM Stations in 11ah," Doc: 11-12-0610-00-00ah, May 2012, 11 pages.

Yang, X., et al., "AID reassignment for TIM and non-TIM modes switching," doc: IEEE 802.11-12/891r0, Jul. 13, 2012, 9 pages.

International Search Report and Written Opinion of Patent Cooperation Treaty (PCT), International Application No. PCT/CN2012/083276, Applicant Huawei Technologies Co., Ltd., date of mailing Mar. 21, 2013, 11 pages.

International Search Report and Written Opinion of Patent Cooperation Treaty (PCT), International Application No. PCT/US12/65935, Applicant Huawei Technologies Co., Ltd., date of mailing Feb. 5, 2013, 7 pages.

Partial Supplementary European Search Report received in Application No. 12849267.5-1857, Mailed Nov. 20, 2014, 7 pages.

Sthapit, Pranesh et al., "Effects of Radio Triggered Sensor MAC Protocol over Wireless Sensor Network," 11th IEEE International Conference on Computer and Information Technology, Aug. 31-Sep. 2, 2011, pp. 546-551.

* cited by examiner

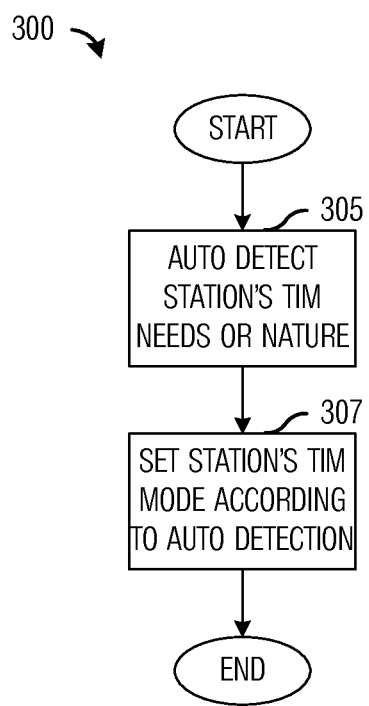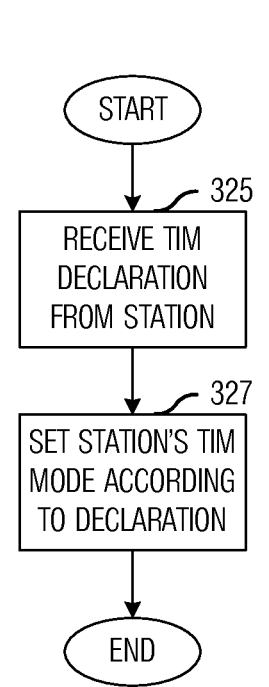
*Fig. 3a*  *Fig. 3b*

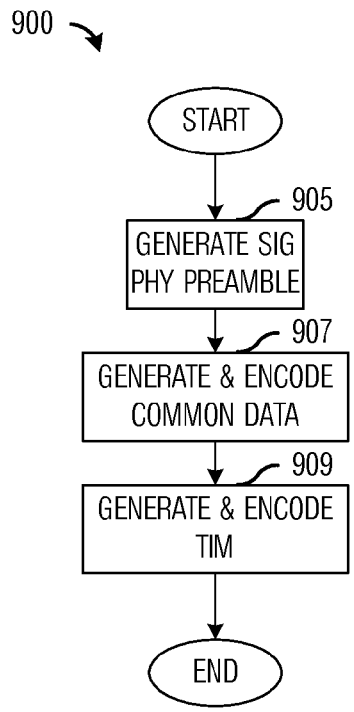
*Fig. 9a*
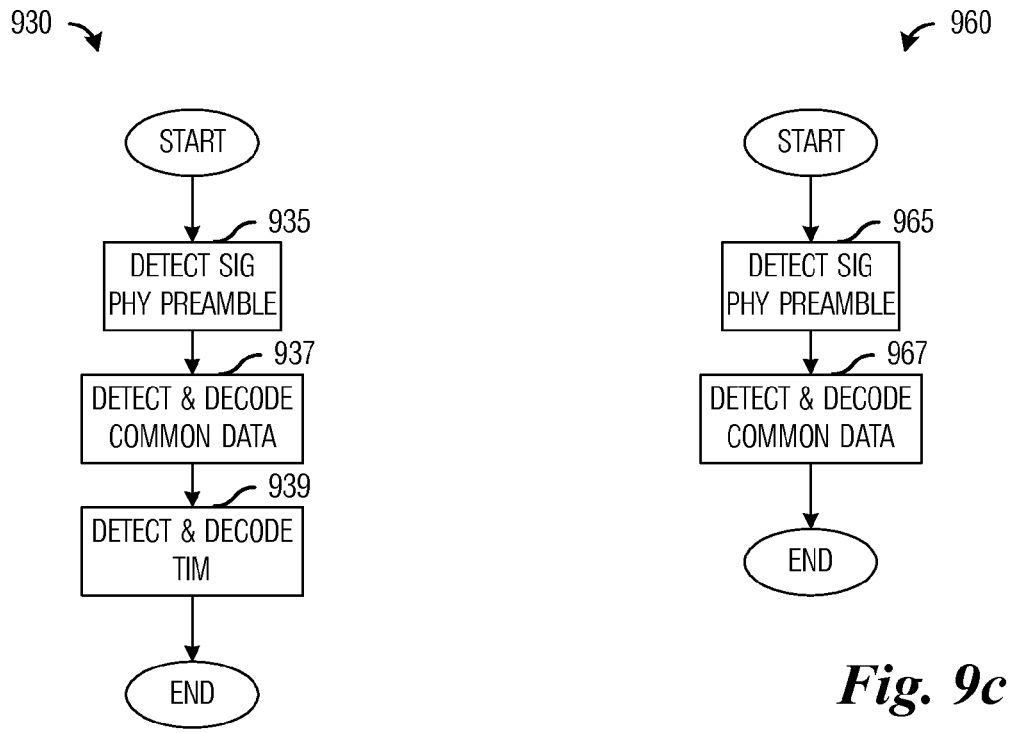
*Fig. 9b*
*Fig. 9c*

SYSTEM AND METHOD FOR COMMUNICATIONS LINK CONTROL

This application claims the benefit of U.S. Provisional Application No. 61/561,707, filed on Nov. 18, 2011, entitled "System and Method for Downlink and Uplink Control in WiFi Networks," which application is hereby incorporated herein by reference.

TECHNICAL FIELD

The present disclosure relates generally to digital communications, and more particularly to a system and method for communications link control.

BACKGROUND

In an IEEE 802.11 compliant communications system (also known as WiFi), an access point (AP) serves one or more stations (STA) by receiving transmissions from the one or more STA and forwarding the transmissions to their intended destinations. Similarly, the AP receives a transmission intended for one of its STA and forwards the transmission to the STA. A transmission occurs over unidirectional channels referred to as communications links. A transmission from a STA to the AP may be referred as an uplink (UL) transmission, while a transmission from the AP to a STA may be referred to as a downlink (DL) transmission.

SUMMARY OF THE DISCLOSURE

Example embodiments of the present disclosure which provide a system and method for communications link control.

In accordance with an example embodiment of the present disclosure, a method for operating an access point is provided. The method includes receiving, by the access point, information from a first station configured to operate in a non-traffic-indication-map (non-TIM) mode. The method also includes determining, by the access point, if downlink data intended for the first station is available at the access point. The method further includes transmitting, by the access point, at least one of the downlink data intended for the first station to the first station, a data indicator indicating that the downlink data intended for the first station is available at the access point, information indicating downlink data is available for the first station, and a time indicator indicating a specific time when the downlink data intended for the first station will be sent to the first station.

In accordance with another example embodiment of the present disclosure, a method for operating a station is provided. The method includes transmitting, by the station configured to operate as a non-traffic-indication-map (non-TIM) station, to an access point at least one of uplink data and a request for downlink data intended for the station. The method also includes receiving, by the station from the access point, at least one of the downlink data intended for the station, a data indicator indicating that the downlink data intended for the station is available at the access point, information indicating downlink data is available for the station, and a time indicator indicating a specific time when the downlink data intended for the station will be send to the station.

In accordance with another example embodiment of the present disclosure, an access point is provided. The access point includes a receiver, a transmitter, and a processor operatively coupled to the receiver and to the transmitter. The receiver receives information from a first station configured to operate in a non-traffic-indication-map (non-TIM) mode. The transmitter transmits at least one of downlink data intended for the first station to the first station, a data indicator indicating that the downlink data intended for the first station is available at the access point, information indicating downlink data is available for the first station, and a time indicator indicating a specific time when the downlink data intended for the first station will be sent to the first station. The processor determines if the downlink data intended for the first station is available at the access point.

One advantage of an embodiment is that stations that do not receive any or very little traffic may not need to monitor for an indicator of such traffic, therefore, the stations may be able to sleep for extended periods of time. Hence, the power consumption of the stations may be reduced and the battery life of the stations may be increased.

A further advantage of an embodiment is that techniques allowing the stations that do not receive any or very little traffic to specify that they are ready to receive any traffic addressed to them are presented. Therefore, the stations are still able to communicate without consuming large amounts of power.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3a illustrates an example flow diagram of operations in an AP as the AP automatically detects a station's type according to example embodiments described herein;

FIG. 3b illustrates an example flow diagram of operations in an AP as the AP detects a station's type using a declaration from the station according to example embodiments described herein;

FIG. 9a illustrates an example flow diagram of operations in an AP generating a beacon according to example embodiments described herein;

FIG. 9b illustrates an example flow diagram of operations in a traffic-indication-map (TIM) station receiving a beacon according to example embodiments described herein;

FIG. 9c illustrates an example flow diagram of operations in a non-TIM station receiving a beacon according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to communications link control. For example, at an access point, the access point broadcasts a beacon that includes a traffic indication map (TIM) to a first station that decodes the TIM and a second station that ignores the TIM. The access point receives a request from the second station requesting downlink data intended for the second station. The access point checks to determine if there is downlink data intended for the second station and transmits the downlink data to the second station if there is downlink data intended for the station. For example, at a station, the station decodes a common data portion of a beacon transmitted by the access point, but ignores a TIM portion of the beacon. The station transmits a request for downlink data intended for the station and receives the downlink data from the access point.

The present disclosure will be described with respect to example embodiments in a specific context, namely downlink data transmissions in an IEEE 802.11 compliant communications system. The disclosure may also be applied, however, to uplink data transmissions in an IEEE 802.11 compliant communications systems, as well as uplink and/or downlink data transmissions in other standards compliant communications systems and non-standards compliant communications systems wherein an indicator of transmissions are presented to communications devices.

Figure 1:
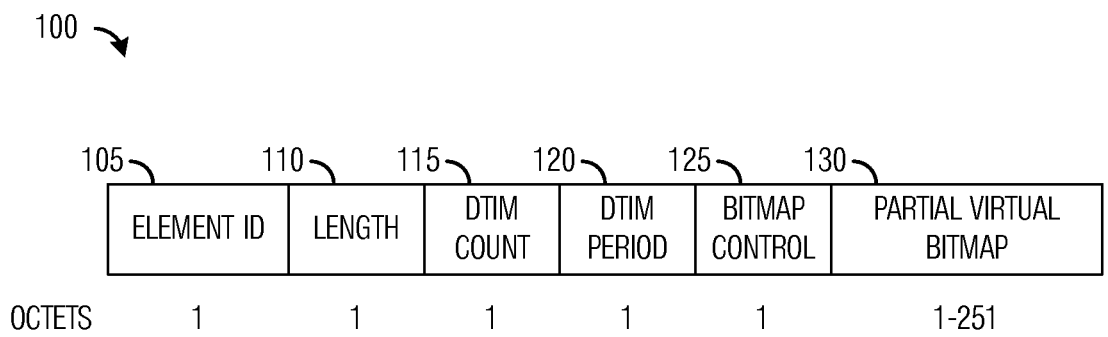
FIG. 1 illustrates a portion of a beacon.

FIG. 1 illustrates a portion of a beacon 100. Beacon 100 is transmitted periodically by an AP and includes an element identifier (element ID) field 105, a length field 110, a delivery traffic indication map (DTIM) count field 115, a DTIM period field 120, a bitmap control field 125, and a partial virtual bitmap field 130. Element ID field 105, length field 110, DTIM count field 115, DTIM period field 120, and bitmap control field 125 contain information identifying and specifying a TIM bitmap contained in partial virtual bitmap field 130. The TIM bitmap is maintained by the AP or a mesh STA and consists of up to 2008 bits organized into 251 octets. An N-th bit ($0 \leq N \leq 2007$) in the TIM bitmap corresponds to bit number (N mod 8) in octet [N/8] where a low-order bit of each octet is bit number 0 and a high-order bit of each octet is bit number 7. Each bit in the TIM bitmap corresponds to traffic (data) buffered for a specific STA in a basic service set (BSS) that the AP is going to transmit at a time that beacon 100 is transmitted or a specific neighbor peer mesh STA within the mesh BSS (MBSS) that the mesh STA is going to transmit at a time that beacon 100 is transmitted.

The N-th bit in the TIM bitmap is set to "0" if there is no data (e.g., individually addressed MAC service data unit (MSDU) and/or MAC management protocol data unit (MMPDU)) for the STA corresponding to the N-th bit. If there are any individually addressed data, e.g., MSDU and/or MMPDU, for the STA corresponding to the N-th bit, then the N-th bit in the TIM bitmap is set to "1". It is noted that in legacy IEEE 802.11 systems, e.g., those that are compliant to IEEE 802.11a, 802.11g, 802.11n, 802.11ac, and the like, the maximum number of STAs in a BSS is 2007, so the TIM bitmap is capable of representing all STAs of a single BSS.

Figure 2A:
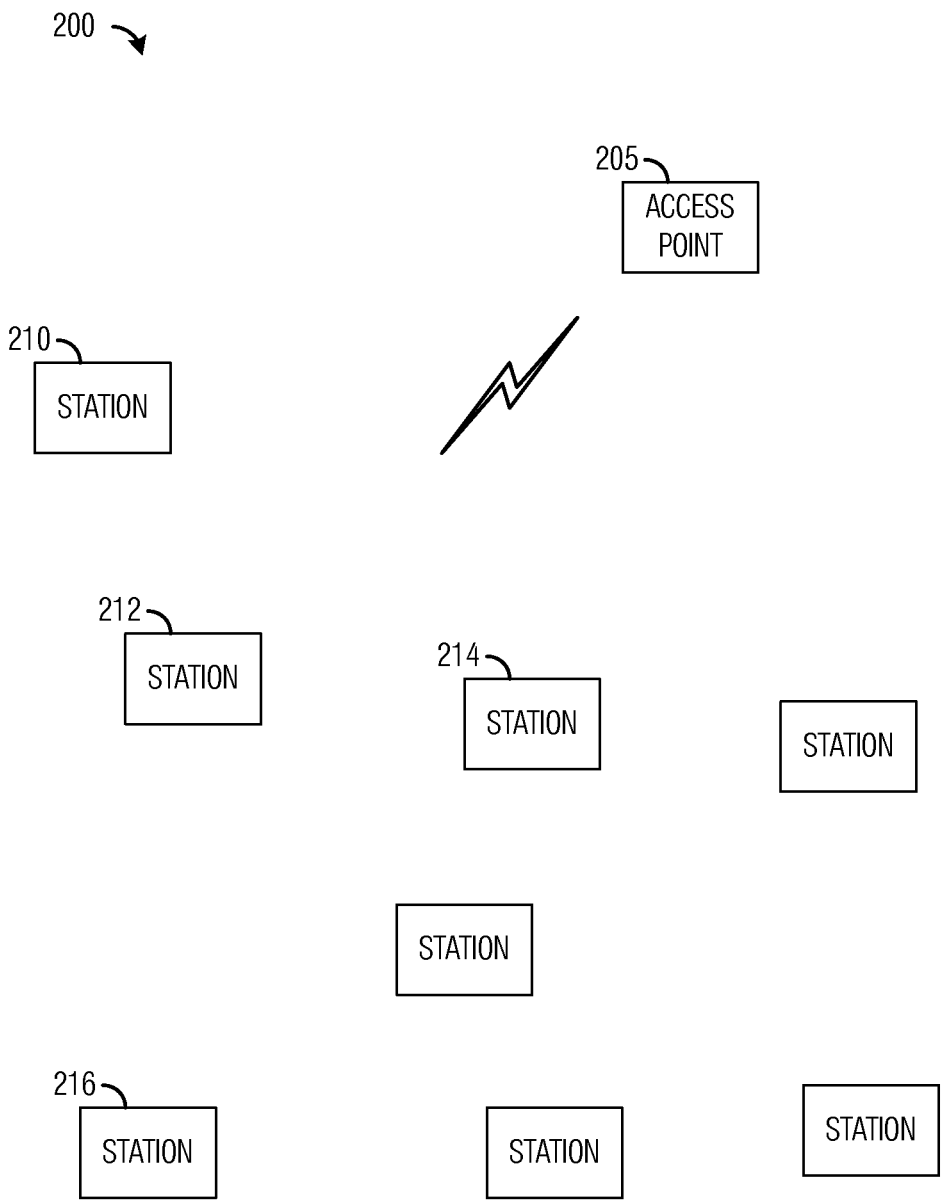
FIG. 2a illustrates an example communications system according to example embodiments described herein.

FIG. 2a illustrates a communications system 200. Communications system 200 includes an AP 205 that serves a plurality of stations, such as station 210, station 212, station 214, and station 216. AP 205 periodically transmits a beacon that includes a TIM bitmap to indicate which station AP 205 has buffered data for. The plurality of stations listen to the beacon, which includes detecting and decoding the beacon, and determines if it will be receiving a transmission from AP 205. If a station will be receiving a transmission from AP 205, then the station may remain awake to receive the transmission. If a station will not be receiving a transmission from AP 205, then the station may go to sleep or perform some other operation.

Recently, a new task group, TGah, has been formed to prepare specifications for under 1 GHz WiFi. The 1 GHz WiFi as specified by TGah is mainly targeted towards sensor networks with traffic offloading from cellular networks being a secondary usage scenario. A requirement for the specifications is to support more than 6000 stations. The 1 GHz WiFi will operate in a narrow bandwidth (between 1 and 2 MHz) achieved by downclocking 20 MHz WiFi implementations. However, this naturally leads to an increased length in the symbol duration from 4 us in 20 MHz to 40 us in 2 MHz.

Figure 2B:
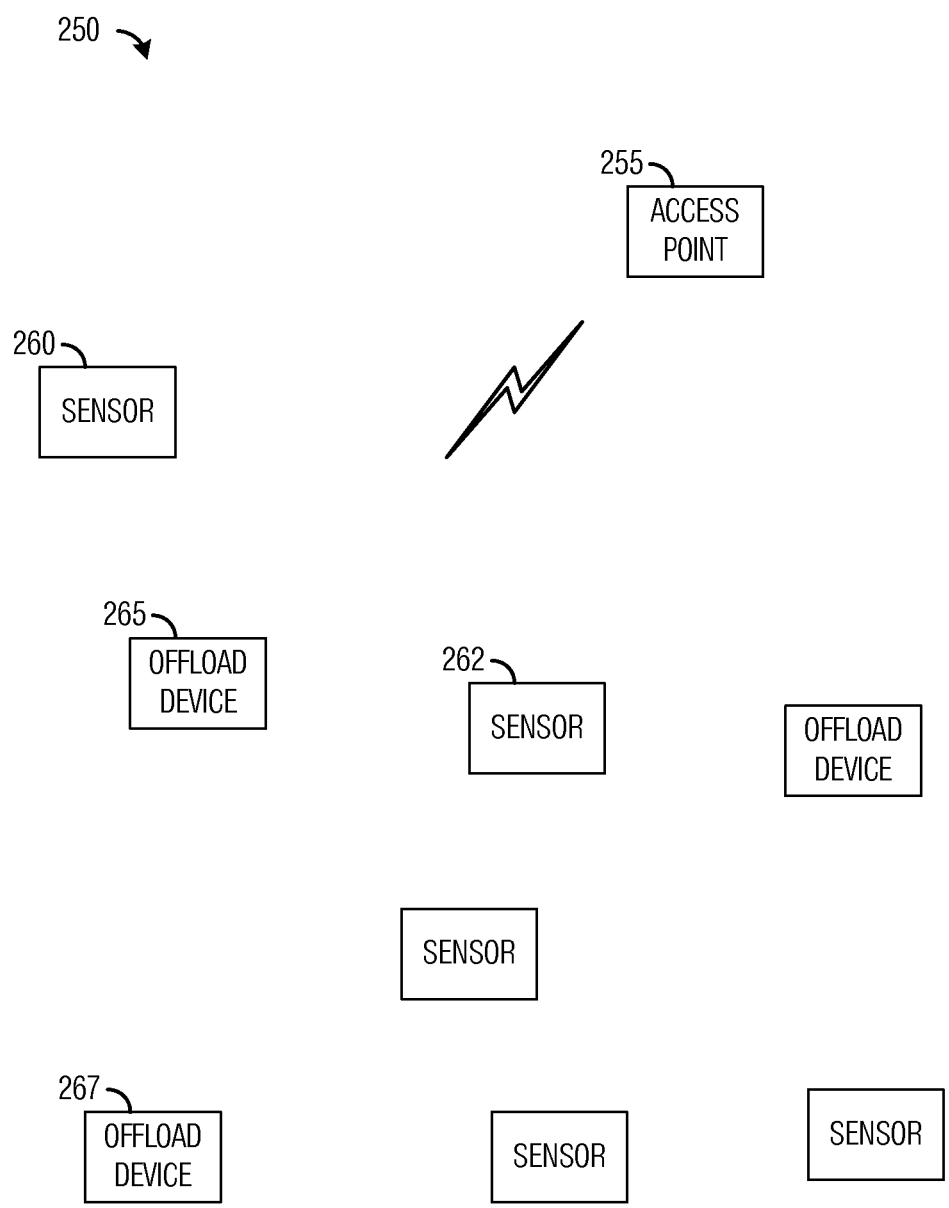
FIG. 2b illustrates an example communications system, wherein the communications system includes sensor devices and traffic offloading devices

FIG. 2b illustrates a communications system 250, wherein communications system 250 includes sensor devices and traffic offloading devices. Communications system 250 may be compliant to the 1 GHz WiFi as specified by TGah. Communications system 250 includes an AP 255 serving a plurality of sensor devices, such as sensor 260 and sensor 262, as well as a plurality of traffic offloading devices, such as offload device 265 and offload device 267. AP 255 may periodically transmit a beacon including a TIM bitmap to indicate to the devices served by AP 255, e.g., the sensor devices and the traffic offloading devices, as well as other types of devices, which of them AP 255 will be transmitting downlink data to. It is noted that communications system 250 may also include other communications devices, such as computers, tablets, telephones, printers, televisions, relays, and the like. However, for simplicity reasons, communications system 250 is shown as including one AP, five sensor devices, and three offload devices.

However, sensor devices generally make their measurements and transmit the measurements to an information aggregator via AP 255 and typically do not receive any or very little downlink data. In other words, sensor devices predominantly make UL transmissions while receiving very few or no DL transmissions. Hence, for a majority of the time, bits in the TIM bitmap corresponding to the sensor devices may likely be set to "0" or without downlink data.

Traffic offloading devices, as well as other devices, such as user equipment (UE), smart phones, computers, tablets, and the like, predominantly receive DL transmissions while typically making a smaller number of UL transmissions. Therefore, there is high probability that bits in the TIM bitmap corresponding to offloading devices will be set to "1" or with downlink data.

Additionally, since sensor devices are usually battery powered, power consumption is another important consideration in sensor networks. Any additional overhead, such as communications overhead, would lead to a shorter battery life, which implies additional costs involved in battery replacement. As an example, if a TIM bitmap was used in the 1 GHz WiFi as specified by TGah, the TIM bitmap would be at least 6000 bits long (with 1 bit per station) and a beacon including the TIM bitmap would be longer than 40 ms long. A sensor actively receiving a 40 ms transmission would consume a large amount of energy, thereby significantly shortening its battery life. Therefore, it may be desirable to not require sensor devices, as well as other devices that have very little or no downlink data, to detect and decode the TIM bitmap, which can result in a significant reduction in power consumption. The sensor devices may be characterized by low duty cycle traffic. Between transmissions they may conserve the energy by switching to a sleep or suspend mode. Sensor devices wake up for UL transmissions.

It is noted that although the discussion focuses on downlink data and TIM bitmaps for downlink transmissions, the example embodiments presented herein are also operable for uplink data and TIM bitmaps for uplink transmissions. Therefore, the discussion of downlink data and TIM bitmaps for downlink transmissions should not be construed as being limiting to either the scope or the spirit of the example embodiments.

According to an example embodiment, stations in a communications system may be categorized into one of two types according to their TIM status, i.e., their use or non-use of the TIM bitmap for downlink data and/or uplink data signaling. A first station type may be referred to as a TIM (or similarly TIM-needed) station, which includes stations that make use of the TIM bitmap for downlink data and/or uplink data signaling. Examples of TIM stations may include traffic offloading devices, UEs, computers, tablets, and the like. A second station type may be referred to as a non-TIM (or similarly TIM-unneeded) station, which includes stations that do not use the TIM bitmap for downlink data and/or uplink data signaling. Examples of non-TIM devices include sensor devices, as well as other devices that have little or no downlink data and/or uplink data. Tables 1 and 2 present summaries of station types for downlink data and uplink data signaling.

TABLE 1

Summary of Station Types for Downlink Data Signaling

| Station Type | Uplink Data | Downlink Data |
|---|---|---|
| TIM | YES | YES |
| non-TIM | X | NO/Little |

TABLE 2

Summary of Station Types for Uplink Data Signaling

| Station Type | Uplink Data | Downlink Data |
|---|---|---|
| TIM | YES | YES |
| non-TIM | No/Little | X |

As shown in Table 1, a station may be classified as a non-TIM station when it has little or no downlink data. Similarly, as shown in Table 2, a station may be classified as a non-TIM station when it has little or no uplink data.

According to an example embodiment, a station's type (e.g., either TIM or non-TIM) may be automatically detected, such as detected according to the nature of the station or by needs of the station.

FIG. 3a illustrates a flow diagram of operations 300 in an AP as the AP automatically detects a station's type. Operations 300 may begin with the AP automatically detecting the TIM needs of the station or the nature (e.g., a sensor device or a traffic offloading device) of the station (block 305). The AP may set the station's type according to the automatically detected information regarding the station (block 307). As an example, if the station is a sensor device, then the station may be set to a non-TIM station. While if the station is a traffic offloading device, then the station may be set the station's type to a TIM station. As another example, if the station has very low or no downlink data requirements, then the station may set the station's type to a non-TIM station. As another example, the AP may obtain information about the station from a subscriber database.

According to an alternative example embodiment, the station's type may be negotiated. As an example, the station's type may be negotiated between the station and the AP a higher level network entity, such as an access controller, an authentication, authorization, and accounting (AAA) server, and the like, when the station attaches to the communications system or handovers to the communications system. As an example, the AP or the higher level network entity may inquire about the purpose of the station's connection and set the station's type accordingly. As an alternative example, the AP or the higher level network entity may inquire about the bandwidth requirements, nature of traffic, traffic priority, and the like, and set the station's type accordingly. As another example, the station may announce to the AP via a message (e.g., an association message, an authentication message, or some other message) about their TIM needs. The station may declare that it is a UL predominant device with little or no DL needs and does not need TIM information, thereby causing the AP to set its station type to non-TIM. Similarly, the station may declare that it is a DL predominant device and does need TIM information, thereby causing the AP to set its station type to TIM.

FIG. 3b illustrates a flow diagram of operations 320 in an AP as the AP detects a station's type using a declaration from the station. Operations 320 may begin with the AP receiving a TIM declaration from the station (block 325). As an example, the station may declare that it is a non-TIM station or a TIM station. As another example, the station may declare that it has very little or no downlink data requirements or some other level (e.g., small, medium, large, and the like) downlink data requirement. The AP may set the station's type according to the declaration of the station (block 327).

Furthermore, the station's type may change during its lifetime. As an example, a non-TIM station may change to a TIM station if there is a period of time when it needs to receive a significant amount of downlink data or if the station has requested downlink data at a specified frequency. Similarly, a TIM station may change to a non-TIM station if its battery is running low and/or its user hasn't initiated any communications for a specified period of time. It is noted that the example embodiments presented herein, such as changes to the station's type, higher level network entities, and the like, are merely illustrative examples and are not intended to be exhaustive lists of possible example embodiments.

Once the AP has set the station type of a station, the AP may send a message to the station to inform it of its station type, either TIM or non-TIM. If the station's type is TIM, then it may detect and decode the beacons as well as the TIM, while if the station's type is non-TIM, then it may or may not detect and decode the beacons, but it may avoid detecting and decoding the TIM. According to an example embodiment, if the AP changes a station's station type, the AP may change the station's address identifier (AID). The AP may inform the station of its AID by embedding the information in the same message used to inform the station of its station type or the AP may send a separate message to inform the station of its AID.

Figure 4:
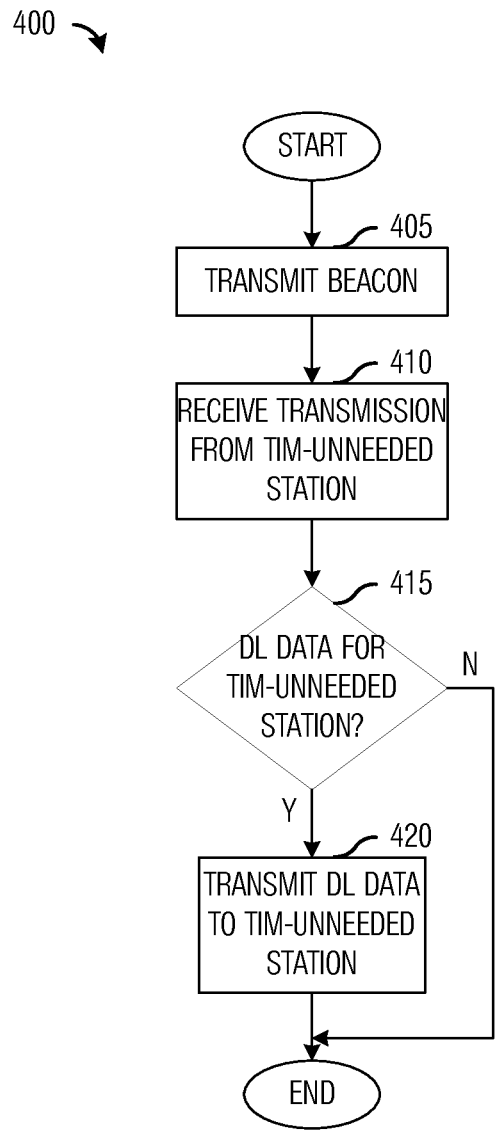
FIG. 4 illustrates an example flow diagram of operations occurring in an AP as the AP provides downlink data to a non-TIM station according to example embodiments described herein.

FIG. 4 illustrates a flow diagram of operations 400 occurring in an AP as the AP provides downlink data to a non-TIM station. Operations 400 may be indicative of operations occurring in an AP, such as AP 255, as the AP provides downlink data to a non-TIM station, such as a sensor device or a station with very little or no downlink data requirements.

Operations 400 may begin with the AP transmitting a beacon that includes a TIM bitmap (block 405). The AP may broadcast the beacon, making it available for detecting and decoding by stations operating within transmission range of the AP. However, not every device operating within transmission range of the AP will detect and decode the entire beacon. As an example, a TIM station will detect and decode the beacon, including the TIM bitmap to determine if the AP has downlink data for the TIM station. However, a non-TIM station may detect and decode a portion of the beacon. As an example, the non-TIM station may detect and decode a common portion of the beacon while ignoring the TIM bitmap portion of the beacon. The non-TIM station may also ignore the beacon completely. As an example, the non-TIM station may ignore a first subset of the beacons transmitted by the AP and detect and decode a second subset of the beacons transmitted by the AP. The non-TIM station may detect and decode every other beacon, every second beacon, every third beacon, every fourth beacon, every fifth beacon, and the like, transmitted by the AP, while ignoring all of the other beacons.

The AP may receive a transmission from a non-TIM station (block 410). The transmission from the non-TIM station may contain information. The transmission from the non-TIM station may be a request for downlink data. The request may either be an implicit request or an explicit request for downlink data. An implicit request for downlink data may be in the form of uplink data, such as sensor data, user data, and the like, from the non-TIM station. An explicit request for downlink data may be in the form of a request, such as a PS POLL message, and the like, from the non-TIM station.

The AP may check to determine if it has buffered any individually addressed downlink data, e.g., MSDU and/or MMPDU, for the non-TIM station (block 415). If the AP has buffered downlink data for the non-TIM station, the AP may transmit the buffered downlink data to the non-TIM station (block 420). The AP may immediately transmit the buffered downlink data to the non-TIM station or the AP may initially transmit a response to the transmission from the non-TIM station received in block 410 and the subsequently transmit the buffered downlink data to the non-TIM station. The transmission of the downlink data or the transmission of the response to the transmission from the non-TIM station may also serve as an acknowledgement to the transmission from the non-TIM station in block 410. If the AP does not have any buffered downlink data for the non-TIM station, the AP may acknowledge the transmission from the non-TIM station in block 410.

Figure 5A:
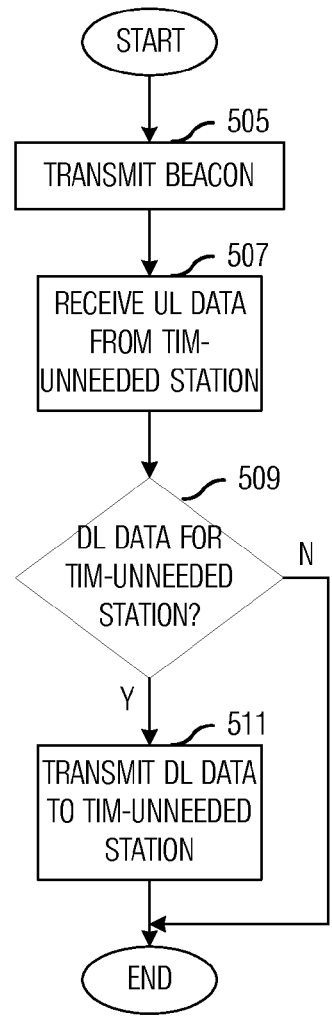
FIG. 5a illustrates an example flow diagram of operations in an AP as the AP transmits downlink data to a non-TIM station in response to an implicit request for downlink data according to example embodiments described herein.

FIG. 5a illustrates a flow diagram of operations 500 in an AP as the AP transmits downlink data to a non-TIM station in response to an implicit request for downlink data. Operations 500 may be indicative of operations occurring in an AP, such as AP 255, as the AP provides downlink data to a non-TIM station, such as a sensor device or a station with very little or no downlink data requirements.

Operations 500 may begin with the AP transmitting a beacon including a TIM bitmap (block 505). The AP may receive uplink data from a non-TIM station (block 507). The uplink data from the non-TIM station may serve as an implicit request for downlink data from the AP. The AP may check to determine if it has any downlink data for the non-TIM station (block 509). If it does, the AP may transmit the downlink data to the non-TIM station (block 511).

Figure 5B:
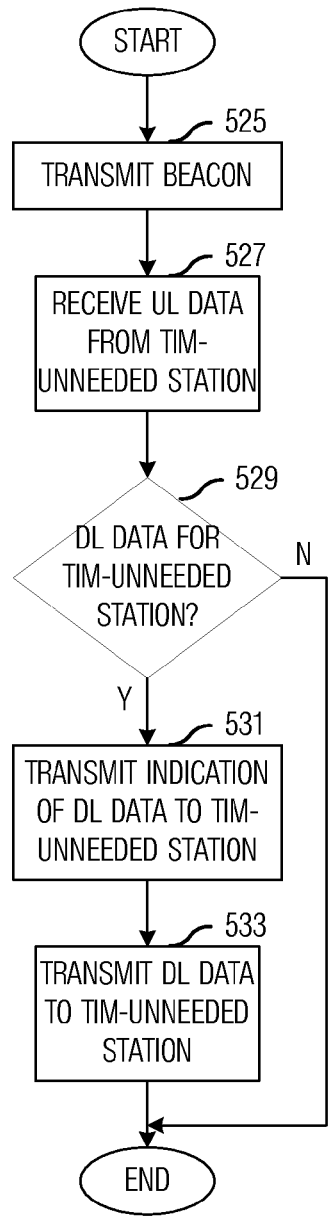
FIG. 5b illustrates an example flow diagram of operations in an AP as the AP transmits an indication of downlink data to a non-TIM station in response to an implicit request for downlink data according to example embodiments described herein.

FIG. 5b illustrates a flow diagram of operations 520 in an AP as the AP transmits an indication of downlink data to a non-TIM station in response to an implicit request for downlink data. Operations 520 may be indicative of operations occurring in an AP, such as AP 255, as the AP provides downlink data to a non-TIM station, such as a sensor device or a station with very little or no downlink data requirements.

Operations 520 may begin with the AP transmitting a beacon including a TIM bitmap (block 525). The AP may receive uplink data from a non-TIM station (block 527). The uplink data from the non-TIM station may serve as an implicit request for downlink data from the AP. The AP may check to determine if it has any downlink data for the non-TIM station (block 529). If it does, the AP may transmit an indication, e.g., a data indicator, a time indicator, the like, of the downlink data to the non-TIM station (block 531) and subsequently transmit the downlink data to the non-TIM station (block 533). As an alternative to an indication, information may be sent to the non-TIM station by the AP.

The data indicator may be a one or more bit indicator that is used to indicate to the non-TIM station that the AP has downlink data intended for the non-TIM station. The time indicator may be a one or more bit indicator that is used to indicate to the non-TIM station when the AP will send downlink data intended for the non-TIM station to the non-TIM station. The time indicator may provide an absolute time value or a relative time value (referenced to a timing reference, such as a transmit time of the time indicator, a beacon, a frame boundary, and the like).

Figures 5C, 5D:
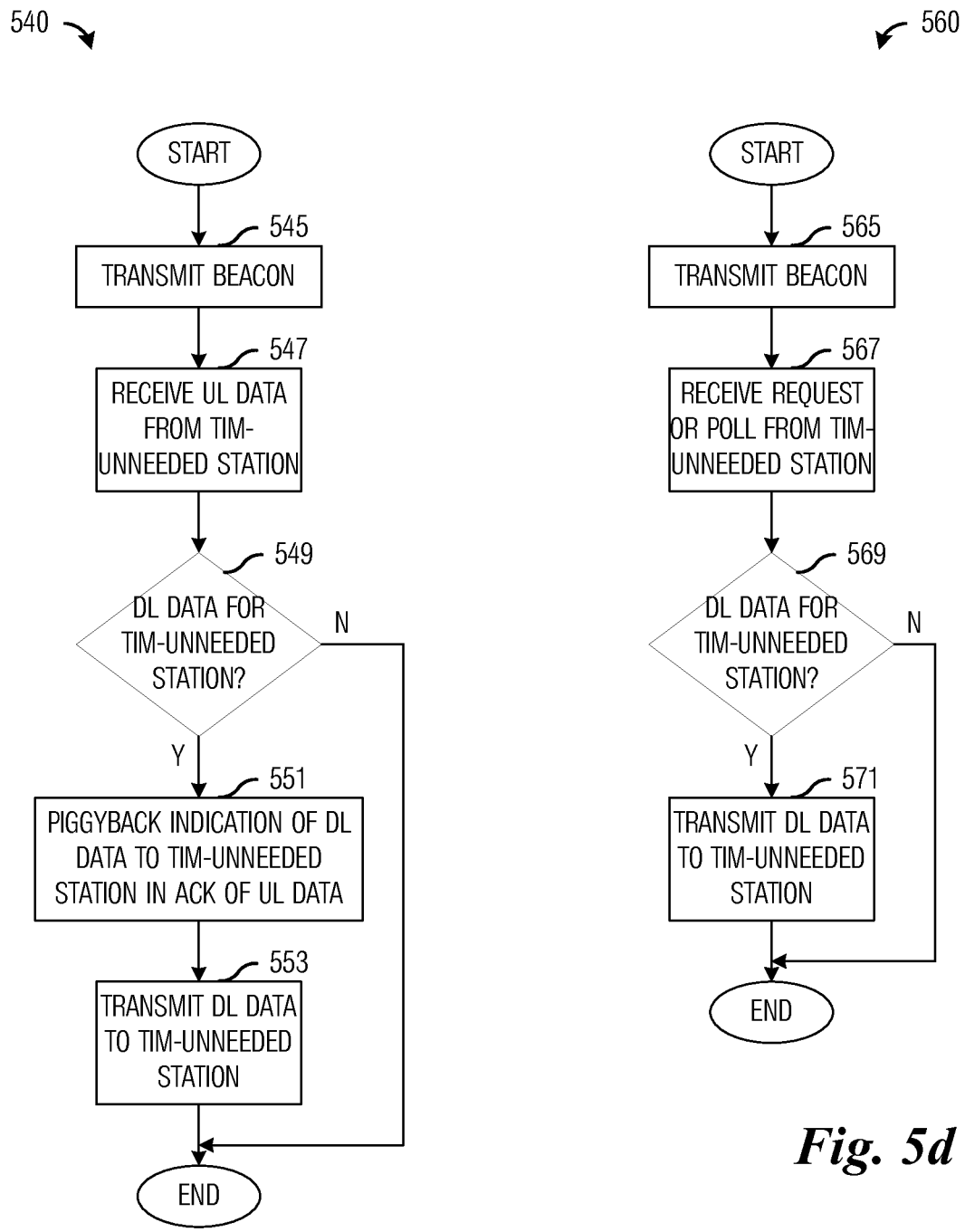
FIG. 5c illustrates an example flow diagram of operations in an AP as the AP transmits an indication of downlink data to a non-TIM station piggybacked with an acknowledgement in response to an implicit request for downlink data according to example embodiments described herein.
FIG. 5d illustrates an example flow diagram of operations in an AP as the AP transmits downlink data to a non-TIM station in response to an explicit request for downlink data according to example embodiments described herein.

FIG. 5c illustrates a flow diagram of operations 540 in an AP as the AP transmits an indication of downlink data to a non-TIM station piggybacked with an acknowledgement in response to an implicit request for downlink data. Operations 540 may be indicative of operations occurring in an AP, such as AP 255, as the AP provides downlink data to a non-TIM station, such as a sensor device or a station with very little or no downlink data requirements.

Operations 540 may begin with the AP transmitting a beacon including a TIM bitmap (block 545). The AP may receive uplink data from a non-TIM station (block 547). The uplink data from the non-TIM station may serve as an implicit request for downlink data from the AP. The AP may check to determine if it has any downlink data for the non-TIM station (block 549). If it does, the AP may transmit an indication, e.g., a data indicator, a time indicator, and the like, of the downlink data to the non-TIM station (block 551). The indication of the downlink data may be piggybacked with an acknowledgement of the uplink data received from the non-TIM station in block 547. The AP may subsequently transmit the downlink data to the non-TIM station (block 553).

FIG. 5d illustrates a flow diagram of operations 560 in an AP as the AP transmits downlink data to a non-TIM station in response to an explicit request for downlink data. Operations 560 may be indicative of operations occurring in an AP, such as AP 255, as the AP provides downlink data to a non-TIM station, such as a sensor device or a station with very little or no downlink data requirements.

Operations 560 may begin with the AP transmitting a beacon including a TIM bitmap (block 565). The AP may receive a request or a poll, such as a PS POLL, for downlink data from a non-TIM station (block 567). The request or poll from the non-TIM station may serve as an explicit request for downlink data from the AP. The AP may check to determine if it has any downlink data for the non-TIM station (block 569). If it does, the AP may transmit the downlink data to the non-TIM station (block 571). Alternatively, the AP may transmit an indication of the downlink data to the non-TIM station and subsequently transmit the downlink data to the non-TIM station.

Figure 6:
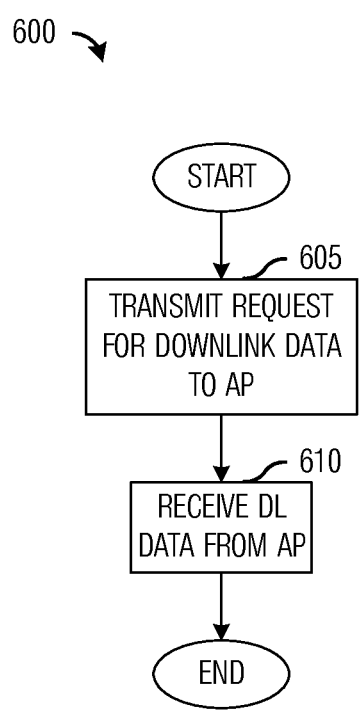
FIG. 6 illustrates an example flow diagram of operations in a non-TIM station as the non-TIM station requests and receives downlink data according to example embodiments described herein.

FIG. 6 illustrates a flow diagram of operations 600 in a non-TIM station as the non-TIM station requests and receives downlink data. Operations 600 may be indicative of operations occurring in a non-TIM station, such as sensor 260, and sensor 262, as the non-TIM station request downlink data from an AP and receives downlink data from the AP.

Operations 600 may begin with the non-TIM station transmitting a request for downlink data to the AP (block 605). The request for downlink data may be an implicit request or an explicit request. As an example, an implicit request may be in the form of a transmission of uplink data from the non-TIM station, while an explicit request may be in the form of a request a poll message, such as a PS POLL. The non-TIM station may then receive the downlink data from the AP (block 610). The non-TIM station may receive the downlink data in a transmission from the AP or the non-TIM station may receive an indication of the downlink data in a transmission and then the downlink data.

Figure 7A:
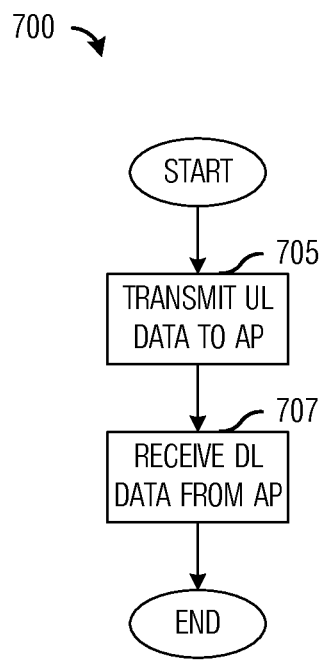
FIG. 7a illustrates an example flow diagram of operations in a non-TIM station as the non-TIM station requests and receives downlink data with an implicit request according to example embodiments described herein.

FIG. 7a illustrates a flow diagram of operations 700 in a non-TIM station as the non-TIM station requests and receives downlink data with an implicit request. Operations 700 may be indicative of operations occurring in a non-TIM station, such as sensor 260, and sensor 262, as the non-TIM station request downlink data from an AP and receives downlink data from the AP.

Operations 700 may begin with the non-TIM station transmitting uplink data to the AP (block 705). The uplink data transmission may serve as an implicit request for downlink data from the non-TIM station. The non-TIM station may receive the downlink data from the AP (block 707).

The non-TIM station may receive an indicator, such as a start decoding indicator, from the AP. The non-TIM station may then start to decode the TIM portion of beacons. The non-TIM station then becomes a TIM station. The start decoding indicator may be received in a separate message or piggybacked in another message.

Alternatively, the non-TIM station may send an inclusion request message to the AP, requesting to be included in TIM signaling. The non-TIM station may then start to decode the TIM portion of beacons. The inclusion request message may be transmitted in a separate message or piggybacked in another message.

The TIM station may receive an indicator, such as a stop decoding indicator, from the AP. The TIM station may then stop decoding the TIM portion of beacons. The TIM station then becomes a non-TIM station. The stop decoding indicator may be received in a separate message or piggybacked in another message.

Alternatively, the TIM station may send an exclusion request message to the AP, requesting to be excluded from TIM signaling. The TIM station may then stop decoding the TIM portion of the beacons. The exclusion request message may be transmitted in a separate message or piggybacked in another message.

Figure 7B:
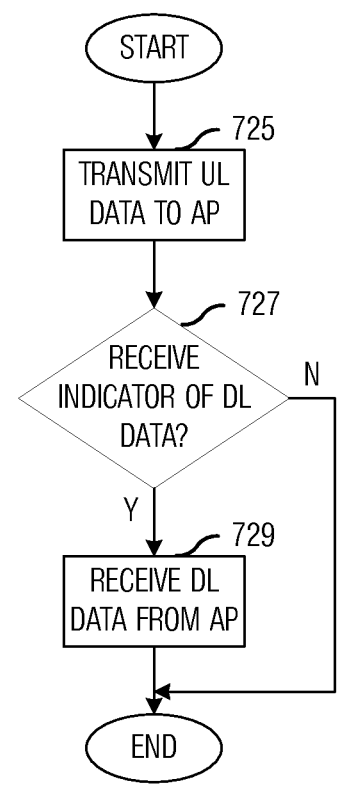
FIG. 7b illustrates an example flow diagram of operations in a non-TIM station as the non-TIM station requests and receives downlink data with an implicit request and receives an indicator of the downlink data according to example embodiments described herein.

FIG. 7b illustrates a flow diagram of operations 720 in a non-TIM station as the non-TIM station requests and receives downlink data with an implicit request and receives an indicator of the downlink data. Operations 720 may be indicative of operations occurring in a non-TIM station, such as sensor 260, and sensor 262, as the non-TIM station request downlink data from an AP and receives downlink data from the AP.

Operations 720 may begin with the non-TIM station transmitting uplink data to the AP (block 725). The uplink data transmission may serve as an implicit request for downlink data from the non-TIM station. The non-TIM station may check to determine if has received an indicator, e.g., a data indicator, a time indicator, and the like, of the downlink data from the AP (block 727) and if it has, the non-TIM station may receive the downlink data from the AP (block 729). As an alternative to an indication, information may be sent to the non-TIM station by the AP.

The data indicator may be a one or more bit indicator that is used to indicate to the non-TIM station that the AP has downlink data intended for the non-TIM station. The time indicator may be a one or more bit indicator that is used to indicate to the non-TIM station when the AP will send downlink data intended for the non-TIM station to the non-TIM station. The time indicator may provide an absolute time value or a relative time value (referenced to a timing reference, such as a transmit time of the time indicator, a beacon, a frame boundary, and the like).

Figure 7C:
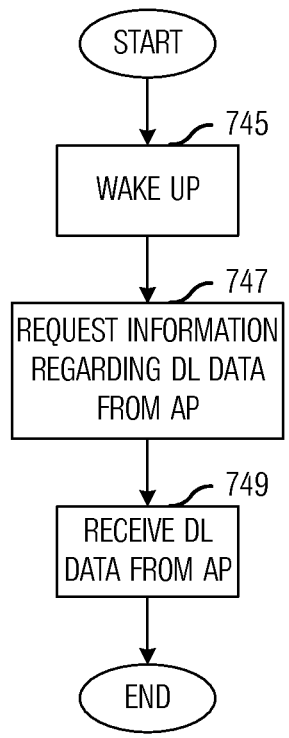
FIG. 7c illustrates an example flow diagram of operations in a non-TIM station as the non-TIM station requests and receives downlink data with an explicit request according to example embodiments described herein.

FIG. 7c illustrates a flow diagram of operations 740 in a non-TIM station as the non-TIM station requests and receives downlink data with an explicit request. Operations 740 may be indicative of operations occurring in a non-TIM station, such as sensor 260, and sensor 262, as the non-TIM station request downlink data from an AP and receives downlink data from the AP.

Operations 740 may begin with the non-TIM station waking up or otherwise initiating a process to receive downlink data (block 745). The non-TIM station may transmit a request for downlink data to the AP (block 747). The request may serve as an explicit request for downlink data from the non- TIM station and may be in the form of a poll message, such as a PS POLL. The non-TIM station may receive the downlink data from the AP (block 749).

Figure 7D:
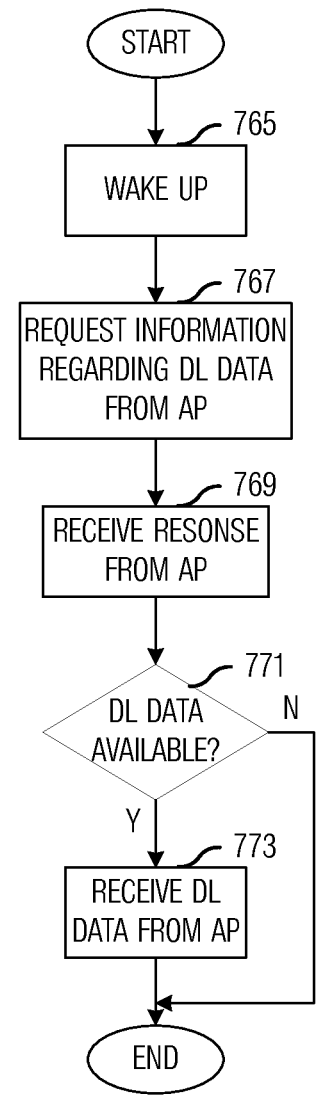
FIG. 7d illustrates an example flow diagram of operations in a non-TIM station as the non-TIM station requests and receives downlink data with an explicit request and receives an indicator of the downlink data according to example embodiments described herein.

FIG. 7d illustrates a flow diagram of operations 760 in a non-TIM station as the non-TIM station requests and receives downlink data with an explicit request and receives an indicator of the downlink data. Operations 760 may be indicative of operations occurring in a non-TIM station, such as sensor 260, and sensor 262, as the non-TIM station request downlink data from an AP and receives downlink data from the AP.

Operations 760 may begin with the non-TIM station waking up or otherwise initiating a process to receive downlink data (block 765). The non-TIM station may transmit a request for downlink data to the AP (block 767). The request may serve as an explicit request for downlink data from the non-TIM station and may be in the form of a poll message, such as a PS POLL. The non-TIM station may receive a response from the AP (block 769). The response may arise from the request for downlink data transmitted in block 767. The non-TIM station may check to determine if has received an indicator of the downlink data from the AP (block 771) and if it has, the non-TIM station may receive the downlink data from the AP (block 773).

Figure 8A:
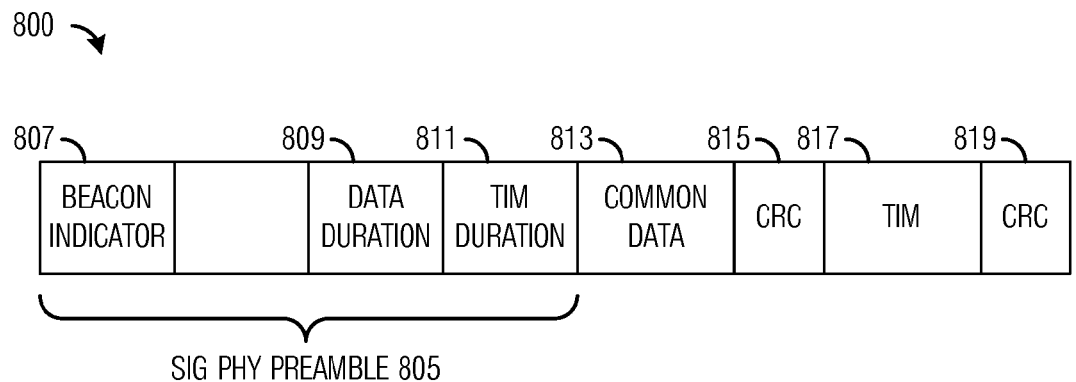
FIGS. 8a through 8c illustrate example beacons for supporting multiple station types according to example embodiments described herein.

FIG. 8a illustrates a first beacon 800 for supporting multiple station types. According to an example embodiment, in order to support multiple station types, a beacon may include a separate common data area and a separate TIM area. Furthermore, the common data area and the TIM area should be encoded separately so that a station that is not interested in the TIM area does not need to detect and decode the TIM area in order to detect and decode the common area. First beacon 800 includes a signal (SIG) physical layer (PHY) preamble 805 that may include a beacon indicator 807, which may be a one or more bit indicator indicating that a beacon is being transmitted. SIG PHY preamble 805 may also include a data duration field 809 that indicates a duration (e.g., in time or symbols) of a common data area of first beacon 800 and a TIM duration field 811 that indicates a duration (e.g., in time or symbols) of a TIM area of first beacon 800.

First beacon 800 also includes a common data area comprising a common data field 813 and a cyclic redundancy check (CRC) field 815 for common data field 813, and a TIM area comprising a TIM bitmap 817 and a CRC field 819 for TIM bitmap 817. As discussed above, the duration of common data field 813 may be specified by data duration field 809, while TIM duration field 811 may specify the duration of TIM bitmap 817. Additionally, common data field 813 and TIM bitmap 817 may be separately encoded so that a station that is not interested in the TIM bitmap may not need to detect and decode TIM bitmap 817 in order to detect and decode common data field 813.

Figure 8B:
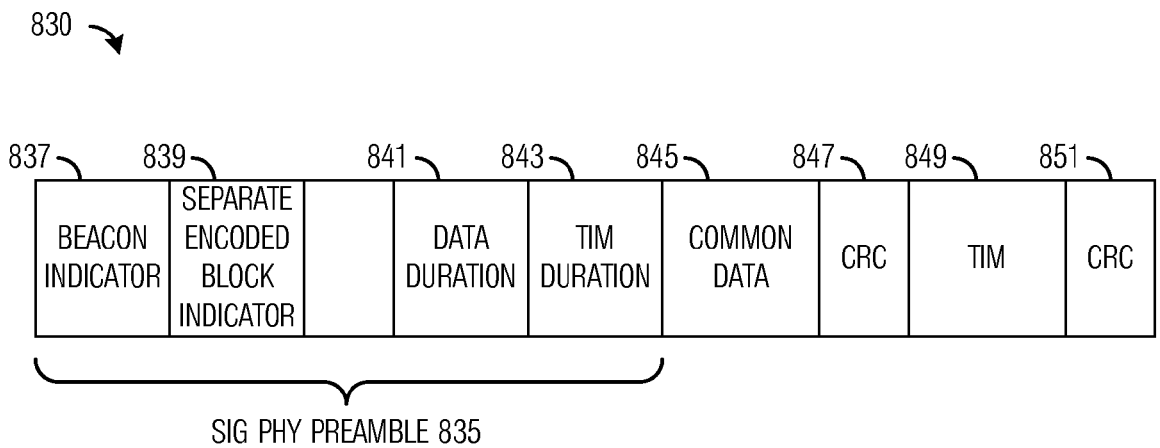

FIG. 8b illustrates a second beacon 830 for supporting multiple station types. Second beacon 830 includes a SIG PHY preamble 835 that may include a beacon indicator 837 to indicate that a beacon is being transmitted, and a separate encoded block indicator 839 to indicate that second beacon 830 includes more than one block of separately encoded information. It is noted that beacon indicator 837 may be used in place of separate encoded block indicator 839 meaning that beacon indicator 837 may indicate both a beacon being transmitted and that the beacon includes more than one block of separately encoded information. SIG PHY preamble 835 may also include a data duration field 841 that indicates a duration (e.g., in time or symbols) of a common data area of second beacon 830 and a TIM duration field 843 that indicates a duration (e.g., in time or symbols) of a TIM area of second beacon 830.

Second beacon 830 also includes a common data area comprising a common data field 845 and a CRC field 847 for common data field 845, and a TIM area comprising a TIM bitmap 849 and a CRC field 851 for TIM bitmap 849. As discussed above, the duration of common data field 845 may be specified by data duration field 841, while TIM duration field 843 may specify the duration of TIM bitmap 849. Additionally, common data field 845 and TIM bitmap 849 may be separately encoded so that a station that is not interested in the TIM bitmap may not need to detect and decode TIM bitmap 849 in order to detect and decode common data field 845.

Figure 8C:
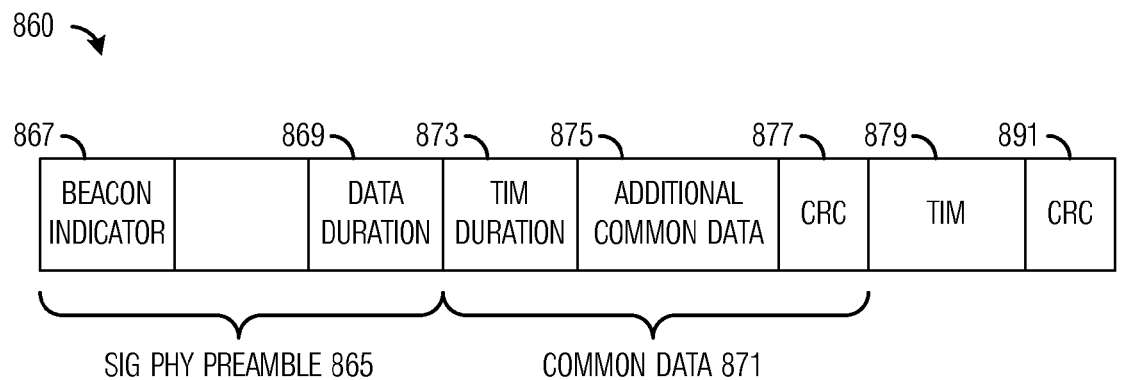

FIG. 8c illustrates a third beacon 860 for supporting multiple station types. Third beacon 860 includes a SIG PHY preamble 865 that may include a beacon indicator 867 to indicate that a beacon is being transmitted. SIG PHY preamble 865 may also include a data duration field 869 that indicates a duration (e.g., in time or symbols) of a common data area of third beacon 860.

Third beacon 860 also includes a common data area 871 comprising a TIM duration field 873 that indicates a duration (e.g., in time or symbols) of a TIM area of third beacon 860. Common data area 871 also includes an additional data field 875 and a CRC field 877 for common data field 871, and a TIM area comprising a TIM bitmap 879 and a CRC field 881 for TIM bitmap 879. With third beacon 860, non-TIM stations may detect and decode just common data area 871 using data duration field 869, while TIM stations may detect and decode the TIM area using TIM duration field 873 in common data area 871.

According to an alternative example embodiment, a beacon may not include a TIM area. The beacon may just include a common data area and a corresponding TIM area may be transmitted in a separate message, which may be another beacon or a non-beacon transmission. The corresponding TIM area may or may not be periodic in nature and may be transmitted adaptively based on traffic, e.g., downlink traffic, patterns or provided upon request from a station(s).

As discussed above, the duration of common data field 845 may be specified by data duration field 841, while TIM duration field 843 may specify the duration of TIM bitmap 849. Additionally, common data field 845 and TIM bitmap 849 may be separately encoded so that a station that is not interested in the TIM bitmap may not need to detect and decode TIM bitmap 849 in order to detect and decode common data field 845.

FIG. 9a illustrates a flow diagram of operations 900 in an AP generating a beacon. Operations 900 may be indicative of operations occurring in an AP, such as AP 255, generates a beacon. The beacon generated by the AP includes support for TIM and non-TIM station operation.

Operations 900 may begin with the AP generating a SIG PHY preamble for the beacon (block 905). The SIG PHY preamble may include a beacon indicator and/or a separate encoded block indicator. The SIG PHY preamble may also include data duration information. Depending on the beacon, the SIG PHY preamble may further include TIM duration information.

The AP may generate and encode information to be included in the common data portion of the preamble, which may be detected and decoded by both TIM and non-TIM stations (block 907). If the common data portion of the preamble also includes TIM duration information, the AP may place such information in the common data portion. The AP may generate a CRC for the common data portion of the preamble. The AP may generate and encode information to be included in the TIM portion of the preamble, which may be detected and decoded by TIM stations (block 909). The AP may generate a CRC for the TIM portion of the preamble. The AP may transmit the preamble.

FIG. 9b illustrates a flow diagram of operations 930 in a TIM station receiving a beacon. Operations 930 may be indicative of operations occurring in a TIM station, such as an offload device 265 and offload device 267, as the TIM station receives a beacon.

Operations 930 may begin with the TIM station detecting a SIG PHY preamble of the beacon (block 935). The SIG PHY preamble may include, depending on beacon configuration: a beacon indicator, a separate encoded block indicator, data duration information, TIM duration information, common data, a TIM bitmap, or a combination thereof. The TIM station may detect and decode the common data part of the beacon (block 937). Since the TIM station needs information in the TIM bitmap, the TIM station may also detect and decode the TIM part of the beacon (block 939).

FIG. 9c illustrates a flow diagram of operations 960 in a non-TIM station receiving a beacon. Operations 960 may be indicative of operations occurring in a non-TIM station, such as sensor 260, and sensor 262, as the non-TIM station receives a beacon.

Operations 960 may begin with the non-TIM station detecting a SIG PHY preamble of the beacon (block 965). The SIG PHY preamble may include, depending on beacon configuration: a beacon indicator, a separate encoded block indicator, data duration information, TIM duration information, common data, a TIM bitmap, or a combination thereof. The non-TIM station may detect and decode the common data part of the beacon (block 967). However, since the non-TIM station does not generally need information in the TIM bitmap, the non-TIM station typically does not detect and decode the TIM part of the beacon. Although, in some example embodiments, the non-TIM station may periodically or occasionally detect and decode the TIM part of the beacon.

Figure 10:
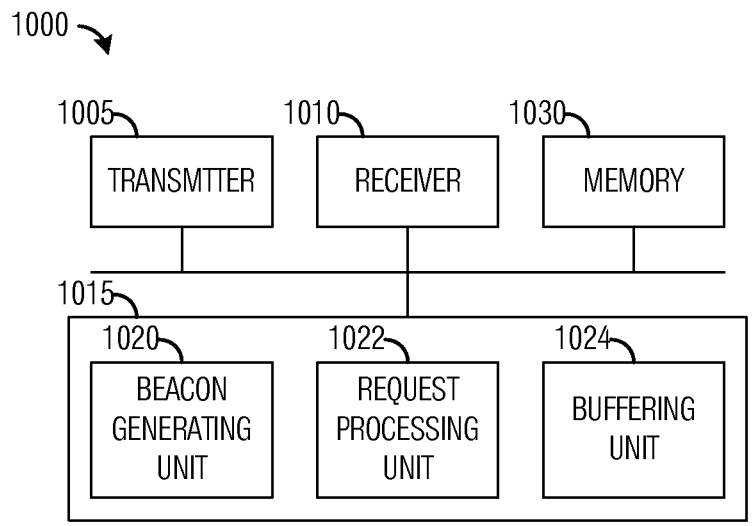
FIG. 10 illustrates an example first communications device according to example embodiments described herein.

FIG. 10 provides an illustration of a first communications device 1000. Communications device 1000 may be an implementation of a communications controller, such as an access point, a base station, an evolved NodeB, and the like. Communications device 1000 may be used to implement various ones of the embodiments discussed herein. As shown in FIG. 10, a transmitter 1005 is configured to send packets and/or signals and a receiver 1010 is configured to receive packets and/or signals. Transmitter 1005 and receiver 1010 may have a wireless interface, a wireline interface, or a combination thereof.

A beacon generating unit 1020 is configured to generate a beacon for use by TIM and non-TIM stations. The beacon may include: a SIG PHY preamble, a common data portion, a TIM portion, or a combination thereof. The beacon may include indicators, duration information, block encoding information, or a combination thereof. A request processing unit 1022 is configure to process a request for data, such as downlink data and/or uplink data, from stations. A buffering unit 1024 is configured to buffer data, such as downlink data and/or uplink data, received by communications device 1000. A memory 1030 is configured to store beacons, duration information, indicators, CRC, common data, TIM information, TIM bitmaps, and so on.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while beacon generating unit 1020, request processing unit 1022, and buffering unit 1024 may be software modules executing in a processor 1015, a microprocessor, a custom circuit, or a custom compiled logic array of a field programmable logic array. Beacon generating unit 1020, request processing unit 1022, and buffering unit 1024 may be stored as modules in memory 1030.

Figure 11:
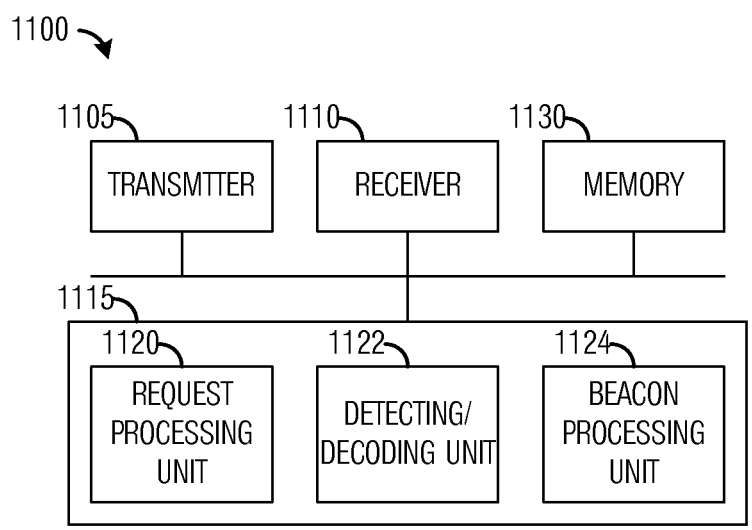
FIG. 11 illustrates an example second communications device according to example embodiments described herein.

FIG. 11 provides an illustration of a second communications device 1100. Communications device 1100 may be an implementation of a communications device, such as a station, a sensor, an offload device, a user equipment, and the like. Communications device 1100 may be used to implement various ones of the embodiments discussed herein. As shown in FIG. 11, a transmitter 1105 is configured to send packets and/or signals and a receiver 1110 is configured to receive packets and/or signals. Transmitter 1105 and receiver 1110 may have a wireless interface, a wireline interface, or a combination thereof.

A request processing unit 1120 is configured to generate a request for data, such as downlink data and/or uplink data, from a communications controller. The request for the data may be an explicit request or an implicit request. A detecting/decoding unit 1122 is configured to detect and/or decode transmissions. As an example, detecting/decoding unit 1122 detects and decodes a common data portion of a beacon, a TIM portion of the beacon, or both. A beacon processing unit 1124 is configured to process information included in the beacon. As an example, beacon processing unit 1124 processes the beacon to determine a duration of the common data portion, to determine if the common data portion and the TIM portion are separately encoded, and the like. A memory 1130 is configured to store beacons, duration information, indicators, CRC, common data, TIM information, TIM bitmaps, and so on.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while request processing unit 1120, detecting/decoding unit 1122, and beacon processing unit 1124 may be software modules executing in a processor 1115, a microprocessor, a custom circuit, or a custom compiled logic array of a field programmable logic array. Request processing unit 1120, detecting/decoding unit 1122, and beacon processing unit 1124 may be stored as modules in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for operating an access point, the method comprising:
receiving, by the access point, information from a first station operating in a non-traffic-indication-map (non-TIM) mode;
broadcasting, by the access point, a beacon comprising a traffic indication map (TIM), wherein the TIM has entries for other stations operating in a TIM mode, and no entry for the first station operating in the non-TIM mode;

determining, by the access point, if downlink unicast data intended for the first station is available at the access point; and transmitting, by the access point, without using the TIM, at least one of the downlink unicast data intended for the first station to the first station, a data indicator indicating that the downlink unicast data intended for the first station is available at the access point, information indicating the downlink unicast data is available for the first station, and a time indicator indicating a specific time when the downlink unicast data intended for the first station will be sent to the first station.

2. The method of claim 1, further comprising determining that the first station is ready to receive data.

3. The method of claim 2, wherein receiving information from the first station comprises receiving a request for the downlink unicast data intended for the first station.

4. The method of claim 2, wherein receiving information from the first station comprises receiving a transmission of uplink data.

5. The method of claim 2, wherein receiving information from the first station comprises receiving a PS POLL message.

6. The method of claim 1, further comprising receiving a TIM unneeded indication from the first station to indicate at least one of the first station does not need the TIM, and the first station does not decode the TIM.

7. The method of claim 6, wherein receiving the TIM unneeded indication occurs during an association process.

8. The method of claim 1, further comprising:
broadcasting the beacon comprising a common data portion and a TIM portion, wherein the TIM is located in the TIM portion;
encoding the TIM portion; and
encoding the common data portion.

9. The method of claim 8, wherein the TIM portion and the common data portion are encoded so that they can be separately decoded.

10. The method of claim 1, further comprising:
broadcasting the beacon comprising a preamble, a common data portion, and a TIM portion;
encoding the TIM portion with a first field for error detection and correction; and
encoding the preamble and the common data portion with a second field for error detection and correction.

11. The method of claim 10, wherein the TIM portion is encoded separately from the preamble and the common data portion.

12. The method of claim 10, wherein the preamble comprises a beacon indicator, one of common data duration information and common data length information, and one of TIM duration information and TIM length information.

13. The method of claim 12, wherein the preamble comprises a separate block encoding indicator.

14. The method of claim 10, wherein the preamble comprises a beacon indicator, and common data duration information.

15. The method of claim 14, wherein the common data portion comprises TIM duration information.

16. The method of claim 1, further comprising transmitting a first message to a second station operating in a TIM mode, the first message indicating the second station to switch to operating in the non-TIM mode.

17. The method of claim 16, further comprising transmitting a second message to the second station including a new association identifier for the second station.

18. The method of claim 16, further comprising transmitting a third message to the first station including a new association identifier for the first station.

19. The method of claim 1, further comprising transmitting a fourth message to the first station indicating the first station to switch to operating in a TIM mode.

20. The method of claim 1, further comprising placing the downlink unicast data for the first station in a memory.

21. A method for operating a station, the method comprising:
operating, by the station, as a non-traffic-indication-map (non-TIM) station;
ignoring, by the station, a traffic indication map (TIM) in a beacon transmitted by an access point, wherein the TIM has entries for other stations operating in a TIM mode, and no entry for the station operating in the non-TIM mode;
transmitting, by the station to the access point, at least one of uplink data and a request for downlink unicast data intended for the station; and
receiving, by the station from the access point, without using the TIM, at least one of the downlink unicast data intended for the station, a data indicator indicating that the downlink unicast data intended for the station is available at the access point, information indicating the downlink unicast data is available for the station, and a time indicator indicating a specific time when the downlink unicast data intended for the station will be send to the station.

22. The method of claim 21, wherein transmitting the request comprises transmitting a PS POLL message.

23. The method of claim 21, further comprising transmitting a TIM unneeded indication to the access point.

24. The method of claim 21, further comprising receiving a non-TIM indicator from the access point.

25. The method of claim 21, further comprising transmitting, to the access point, a first message indicating that the station is switching from operating as a non-TIM station to operating as a TIM station.

26. The method of claim 25, further comprising, receiving a second message including an association identifier for the station.

27. An access point comprising:
a receiver configured to receive information from a first station operating in a non-traffic-indication-map (non-TIM) mode;
a transmitter configured to:
broadcast a beacon comprising a traffic indication map (TIM), wherein the TIM has entries for other stations operating in a TIM mode, and no entry for the first station operating in the non-TIM mode;
transmit, without using the TIM, at least one of downlink unicast data intended for the first station to the first station, a data indicator indicating that the downlink unicast data intended for the first station is available at the access point, information indicating the downlink unicast data is available for the first station, and a time indicator indicating a specific time when the downlink unicast data intended for the first station will be sent to the first station; and
a processor operatively coupled to the receiver and to the transmitter, the processor configured to determine if the downlink unicast data intended for the first station is available at the access point.

28. The access point of claim 27, wherein the receiver is configured to receive a transmission of uplink data.

29. The access point of claim 27, wherein the receiver is configured to receive a PS POLL message.

30. The access point of claim 27, wherein the receiver is configured to receive a request for the downlink unicast data intended for the first station.

31. The access point of claim 27, wherein the receiver is configured to receive a TIM unneeded indication from the first station to indicate at least one of the first station does not need the TIM, and the first station does not decode the TIM.

32. The access point of claim 31, wherein the TIM unneeded indication is received during an association process.

33. The access point of claim 27, wherein the transmitter is configured to broadcast the beacon comprising a common data portion, and a TIM portion, and wherein the processor is configured to encode the TIM portion and the common data portion so they can be separately decoded.

34. The access point of claim 27, wherein the transmitter is configured to broadcast the beacon comprising a preamble, a common data portion, and a TIM portion, and wherein the processor is configured to encode the TIM portion, and to encode the preamble and the common data portion so they can be separately decoded.

35. The access point of claim 27, wherein the transmitter is configured to transmit a start decoding indicator to a second station configured to ignore the TIM, the second station to start decoding the TIM.

36. The access point of claim 27, wherein the transmitter is configured to transmit a stop decoding indicator to a third station configured to decode the TIM, the third station to stop decoding the TIM.

* * * * *

UNITED STATES PATENT AND TRADEMARK OFFICE
CERTIFICATE OF CORRECTION

| | | |
|---|---|---|
| PATENT NO. | : 9,019,986 B2 | Page 1 of 1 |
| APPLICATION NO. | : 13/649082 | |
| DATED | : April 28, 2015 | |
| INVENTOR(S) | : George Calcev | |

It is certified that error appears in the above-identified patent and that said Letters Patent is hereby corrected as shown below:

In the Specification

In Col. 1, line 62, Summary of The Disclosure, delete "link data intended for the station will be send to the station." and insert --link data intended for the station will be sent to the station.--.

In the Claims

In Col. 16, line 31, claim 21, delete "link unicast data intended for the station will be send to" and insert --link unicast data intended for the station will be sent to--.

Signed and Sealed this
Eighth Day of September, 2015

Michelle K. Lee
*Director of the United States Patent and Trademark Office*